US012570153B2

(12) United States Patent
Kim

(10) Patent No.: US 12,570,153 B2
(45) Date of Patent: Mar. 10, 2026

(54) DUAL POWER SUPPLY APPARATUS, AND SYSTEM AND METHOD FOR OPERATING AUTONOMOUS VEHICLE

(71) Applicants: Hyundai Motor Company, Seoul (KR); Kia Corporation, Seoul (KR)

(72) Inventor: Jin Gi Kim, Suwon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 140 days.

(21) Appl. No.: 18/385,668

(22) Filed: Oct. 31, 2023

(65) Prior Publication Data

US 2024/0416757 A1      Dec. 19, 2024

(30) Foreign Application Priority Data

Jun. 15, 2023      (KR) ......................... 10-2023-0076883

(51) Int. Cl.
| | |
|---|---|
| *B60L 3/00* | (2019.01) |
| *B60L 3/04* | (2006.01) |
| *B60L 58/12* | (2019.01) |
| *B60W 50/02* | (2012.01) |
| *B60W 50/029* | (2012.01) |
| *B60W 60/00* | (2020.01) |

(52) U.S. Cl.
CPC ............... B60L 3/04 (2013.01); B60L 3/0023 (2013.01); B60L 58/12 (2019.02); B60W 50/0205 (2013.01); B60W 50/029 (2013.01); B60W 60/0016 (2020.02); B60L 2240/547 (2013.01)

(58) Field of Classification Search
CPC .......... B60L 3/04; B60L 3/0023; B60L 58/12; B60L 2240/547; B60L 3/0092; B60L 3/0046; B60L 50/60; B60L 2210/12; B60L 3/00; B60W 50/0205; B60W 50/029; B60W 60/0016; B60W 50/023; B60W 2050/021; B60W 2050/0292; B60W 2510/244; B60R 16/0238; B60R 16/03; B60R 16/033; B60Y 2306/13; B60Y 2306/15; Y02T 10/64; Y02T 10/70
USPC .......................................................... 701/22
See application file for complete search history.

(56) References Cited

U.S. PATENT DOCUMENTS

| | | | | |
|---|---|---|---|---|
| 10,293,767 B2 * | 5/2019 | Lee | ......................... | B60R 16/03 |
| 2019/0176638 A1 * | 6/2019 | Anderson | .......... | G01R 31/3832 |
| 2020/0017520 A1 * | 1/2020 | Wang | ..................... | A61P 29/00 |

* cited by examiner

*Primary Examiner* — Shardul D Patel
(74) *Attorney, Agent, or Firm* — Fox Rothschild LLP

(57) ABSTRACT

A dual power supply apparatus for a vehicle includes: at least one power device configured to supply power to an autonomous driving load or a general load in a vehicle, a pair of power lines provided between the at least one power device and the autonomous driving load, and a processor configured to determine whether a first power line of the pair of power lines has failed and to supply power to the autonomous driving load through a second power line of the pair of power lines in response to failure of the first power line.

20 Claims, 9 Drawing Sheets

DUAL POWER SUPPLY APPARATUS, AND SYSTEM AND METHOD FOR OPERATING AUTONOMOUS VEHICLE

CROSS-REFERENCE TO RELATED APPLICATION

This application claims under 35 U.S.C. § 119 (a) the benefit of Korean Patent Application No. 10-2023-0076883, filed in the Korean Intellectual Property Office on Jun. 15, 2023, the entire contents of which are incorporated herein by reference.

BACKGROUND

(a) Technical Field

The present disclosure relates to a dual power supply apparatus, and a system and method for operating a vehicle, more particularly, to the dual power supply apparatus, system, and method capable of preventing an accident that may occur in the event of power supply failure in an autonomous vehicle.

(b) Description of the Related Art

Due to environmental problems, government regulations, and high gas prices, it is necessary to constantly improve fuel efficiency of vehicles, and thus eco-friendly vehicles are in the spotlight, and in particular, autonomous vehicles are likely to be manufactured as eco-friendly vehicles that use electric energy rather than gas-based vehicles.

In the case of such an eco-friendly vehicle, such the vehicle may include a dual power supply system, such as a dual power system for autonomous vehicles, thus providing redundant power supply methods. However, dual power supply systems have not yet been standardized in regulatory specifications or requirements, and may be different for each manufacturer or research institute, so it is necessary to develop standardized redundant power supply technology.

SUMMARY

The present disclosure provides a dual power supply apparatus, and a system and method capable of preventing a power supply failure of an autonomous vehicle by configuring individual power supply lines between a power supply apparatus and an autonomous driving load as a pair of parallel lines and by supplying redundant power through another power line in response to a failure diagnosis on one power line, thereby increasing reliability of the autonomous vehicle.

The dual power supply apparatus, system, and method are capable of increasing the reliability of an autonomous vehicle by using a separate power storage or other power conversion module that does not fail and supplying power stably to the autonomous vehicle in response to failure of the power conversion module that converts power to a low voltage level.

The technical objects of the present disclosure are not limited to the objects mentioned above, and other technical objects not mentioned may be clearly understood by those skilled in the art from the description of the claims.

An exemplary embodiment of the present disclosure provides a dual power supply apparatus for a vehicle including: at least one power device configured to supply power to an autonomous driving load or a general load in the vehicle;

a pair of power lines provided between the at least one power device and the autonomous driving load; and a processor configured to determine whether a first power line of the pair of power lines has failed and to supply power to the autonomous driving load through a second power line of the pair of power lines in response to failure of the first power line.

In an exemplary embodiment of the present disclosure, the processor to determine a failure type in response to a case where a failure of the at least one power line occurs, and it may further include a communication device configured to transmit the failure type to an autonomous driving control apparatus.

In an exemplary embodiment of the present disclosure, the at least one power device may be configured to include a first power device configured to supply power to the general load through a first general power line and to cut off the first general power line in response to a case where the first general power line fails.

In an exemplary embodiment of the present disclosure, it may further include a second power device configured to supply power to the autonomous driving load through a second general power line and to supply power through a redundancy power line in response to a case where the second general power line fails.

In an exemplary embodiment of the present disclosure, the processor may be configured monitoring an output current of the at least one power device to determine whether the pair of power lines have failed.

In an exemplary embodiment of the present disclosure, it may further include, in response to a failure of a first power conversion module that converts a high voltage of a high voltage battery to a first voltage level, a bidirectional converter configured to convert a voltage of a second power conversion module that converts the high voltage of the high voltage battery into a second low voltage level to the first voltage level to supply the converted voltage to the at least one power device.

In an exemplary embodiment of the present disclosure, it may further include: a first power storage node configured to store a voltage of a first voltage level; a second power storage node configured to store a voltage of a second voltage level that is lower than the first voltage level; a first balancing device configured to control connection with the first power storage node and the at least one power device; and a second balancing device configured to control connection with the second power storage node and the at least one power device.

In an exemplary embodiment of the present disclosure, the processor may be configured, in response to a failure of a first power conversion module that converts a high voltage of a high voltage battery to the first voltage level, to control the first balancing device to apply the voltage of the first power storage node to a first power device and a second power device outputting the first voltage level among the at least one power device.

In an exemplary embodiment of the present disclosure, the processor may be configured, in response to a failure of a second power conversion module that converts a high voltage of a high voltage battery to the second voltage level, to control the second balancing device to apply the voltage of the second power storage node to a third power device and a fourth power device outputting the second voltage level among the at least one power device.

In an exemplary embodiment of the present disclosure, the processor may be configured to drive the first power conversion module and the second power conversion module in response to a case where a state of charge (SOC) of the high voltage battery is equal to or greater than a predetermined reference value, and to supply a voltage to the at least one power devices using the first power storage node and the second power storage node in response to a case where the SOC of the high voltage battery is smaller than the predetermined reference value.

In an exemplary embodiment of the present disclosure, the processor may be configured to drive the first power conversion module in response to the SOC of the voltage outputted from the first power conversion module is equal to or greater than the predetermined reference value, and to supply a voltage to the at least one power device using the first power storage node in response to a case where the SOC of the voltage outputted from the first power conversion module is smaller than the predetermined reference value.

A vehicle, e.g., an autonomous vehicle, may include the above-described dual power supply apparatus.

An exemplary embodiment of the present disclosure provides a system including: a high voltage battery; a first power conversion module configured to convert a high voltage of the high voltage battery to a first voltage level; a second power conversion module configured to convert the high voltage of the high voltage battery to a second voltage level that is lower than the first voltage level; and a dual power supply apparatus configured to supply power to an autonomous driving load or a general load in a vehicle, wherein the dual power supply apparatus includes at least one power device configured to supply power to an autonomous driving load or a general load in a vehicle; and a pair of power lines provided between the at least one power device and the autonomous driving load; and a processor configured to determine whether a first power line of the pair of power lines has failed and to supply power to the autonomous driving load through a second power line of the pair of power lines in response to failure of the first power line.

In an exemplary embodiment of the present disclosure, the dual power supply apparatus may be configured to convert the second voltage level of the second power conversion module into the first voltage level to apply the converted voltage level to the at least one power device in response to a failure of the first power conversion module occurs.

In an exemplary embodiment of the present disclosure, the dual power supply apparatus may be configured in response to a failure of the first power conversion module or the second power conversion module, to apply a voltage of the first voltage level or the second voltage level to the at least one power device instead of the first power conversion module or the second power conversion module in which the failure occurs using a power storage node.

In an exemplary embodiment of the present disclosure, it may further include a power controller configured to supply power to the autonomous driving load or the general load.

In an exemplary embodiment of the present disclosure, the dual power supply apparatus may be configured to include one or more dual power supply apparatus provided in an interior of the vehicle A dual power supply method of a dual power supply apparatus including a pair of power lines between at least one power device and an autonomous driving load in a vehicle, the method including: determining, by a processor, whether a first power line of the pair of power lines has failed; and supplying, by the processor, power to the autonomous driving load through a second power line of the pair of power lines in response to failure of the first power line of the pair of power lines.

In an exemplary embodiment of the present disclosure, it may further include: determining, by the processor, a failure type in response to a failure of the first power line; and transmitting the failure type to an autonomous driving control apparatus.

In an exemplary embodiment of the present disclosure, the supplying of the power to the autonomous driving load may include, the pair of power lines including a normal power line and a redundancy power line, supplying, by the processor, power through the redundancy power line in response to a failure of the normal power line.

In an exemplary embodiment of the present disclosure, it may further include monitoring, by the processor, an output current of the at least one power device to determine whether the pair of power lines have failed.

According to the present technique, it is possible to prevent a power supply failure situation of an autonomous vehicle by configuring individual power supply lines between a power supply unit and an autonomous driving load as a pair of parallel lines and by supplying redundant power through another power line in response to diagnosis on one power line, thereby increasing reliability of autonomous vehicles.

According to the present technique, it is possible to increase the reliability of autonomous vehicles by using a separate power storage or other power conversion module that does not fail and supplying power stably to the autonomous vehicles in response to the failure of the power conversion module that converts power to a low voltage level and provides it.

Furthermore, various effects that can be directly or indirectly identified through this document may be provided.

DETAILED DESCRIPTION

Figure 1:
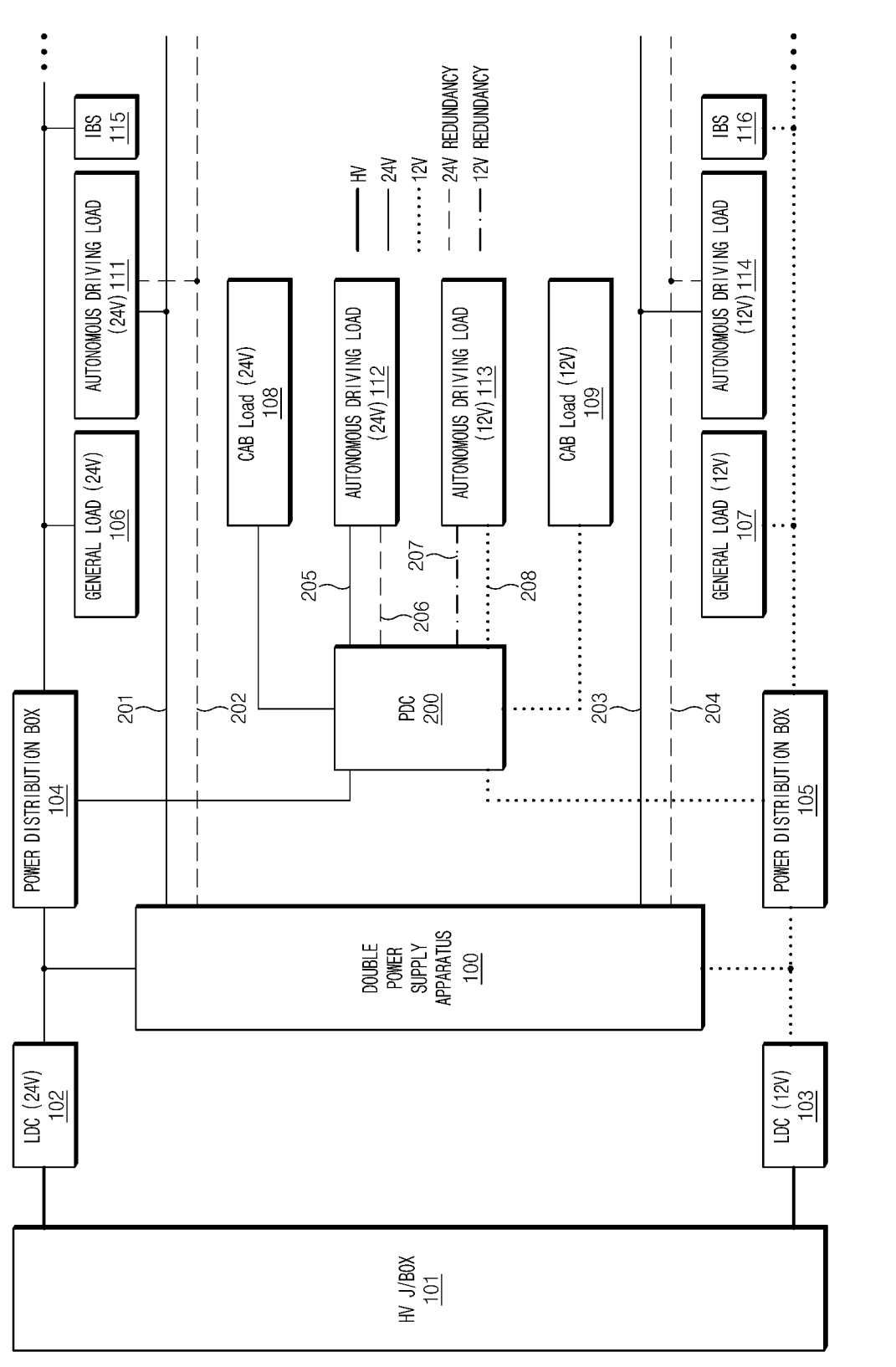
FIG. 1 illustrates a block diagram showing an example configuration of a vehicle system including a dual power supply apparatus.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. In describing an exemplary embodiment, when it is determined that a detailed description of the well-known configuration or function associated with the exemplary embodiment may obscure the gist of the present disclosure, it will be omitted.

In describing constituent elements according to an exemplary embodiment, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

The present disclosure discloses a power supply method in response to a power line failure in a situation where a voltage system of 12 V or 24 V, for example, is mixed as a technique for a low voltage power distribution method for an autonomous vehicle.

Hereinafter, various exemplary embodiments of the present disclosure will be described in detail with reference to FIG. 1 to FIG. 9.

Figure 2:
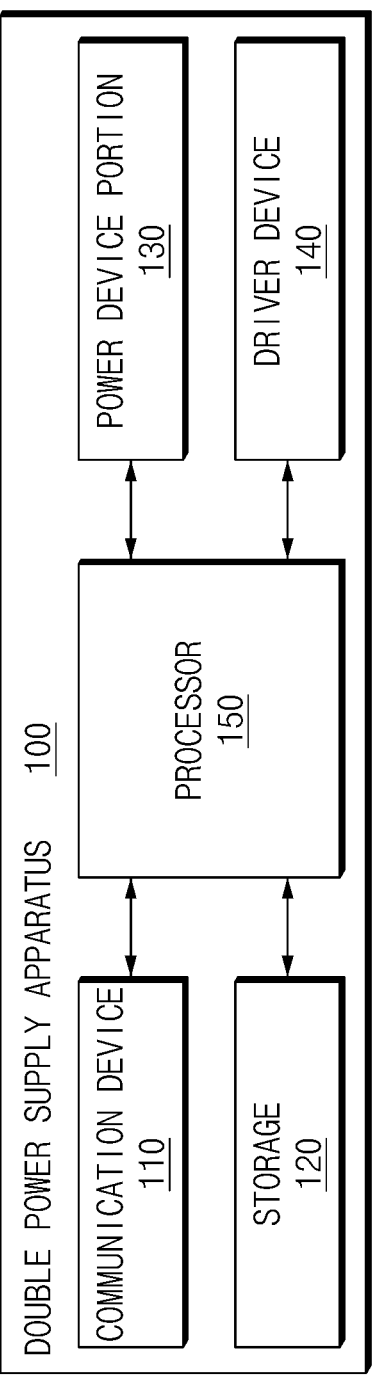
FIG. 2 illustrates an example detailed configuration of a dual power supply apparatus.

FIG. 1 illustrates a block diagram showing an example configuration of a vehicle system including a dual power supply apparatus, and FIG. 2 illustrates an example detailed configuration of a dual power supply apparatus.

Referring to FIG. 1, a vehicle system according to an embodiment of the present disclosure includes a high voltage battery 101, a power conversion module ((low voltage DC-DC converter) 102 and 103, hereinafter referred to as LDC), power distribution boxes 104 and 105, a dual power supply apparatus 100, a power controller 200, general loads 106 and 107, autonomous driving loads 111, 112, 113, and 114, CAB loads 108 and 109, and battery sensors (intelligent battery sensors) 115 and 116.

The LDCs 102 and 103 are power conversion modules that step down the high voltage applied from the high voltage battery 101 to a low voltage of 12 V or 24 V. In addition, the LDCs 102 and 103 may charge an auxiliary battery instead of an alternator (AC generator) of an existing internal combustion engine.

The power distribution boxes 104 and 105 may distribute power converted through the LDCs 102 and 103 and transfer the power to each load and the power controller 200.

The power controller 200 may provide the power distributed through the power distribution boxes 104 and 105 to the CAB loads 108 and 109 and the autonomous driving loads 112 and 113. In this case, the power controller 200 may be connected to the autonomous driving loads 112 and 113 through general power lines 205 and 207 and redundancy power lines 206 and 208. That is, the general power line 205 and the redundancy power line 206 are connected in parallel between the power controller 200 and the autonomous driving load 112, and the general power line 207 and the redundancy power line 208 are connected in parallel between the power controller 200 and the autonomous driving load 113. For example, the power controller 200 may include a powernet domain controller (PDC).

The autonomous driving loads 112 and 113 and the general loads 106 and 107, which are devices that are installed in a vehicle and use power of the vehicle, may include loads that do not cause driving danger due to non-operation of the general loads 106 and 107 while driving. As an example, the general loads 106 and 107 may include an air conditioner, a door driver, a lighting device (lamp), and the like.

The autonomous driving loads 111, 112, 113, and 114 are devices for performing autonomous driving functions and use the power of the vehicle. In addition, the autonomous driving loads 111, 112, 113, and 114 may include autonomous driving essential loads that generate a driving risk in response to non-operation of the autonomous driving loads 111, 112, 113, and 114 during autonomous driving. As an example, the autonomous driving loads 111, 112, 113, and 114 may include a braking controller (e.g., an anti-lock brake system (ABS), an electronic stability program (ESP), etc.), a steering controller (e.g., electric steering, etc.), and the like.

The CAB loads 108 and 109 include loads positioned in a cab area of a large vehicle such as a truck. As an example, the CAB loads 108 and 109 may include lamps and the like.

The battery sensors (IBS) 115 and 116 may measure a state of charge (SOC) of the high voltage battery 101 to provide it to the dual power supply apparatus 100 or the PDC 200.

The dual power supply apparatus 100 according to the present disclosure may be implemented inside or outside the vehicle. In this case, the dual power supply apparatus 100 may be integrally formed with internal control units of the vehicle, or may be implemented as a separate hardware device to be connected to control units of the vehicle by a connection means. For example, the dual power supply apparatus 100 may be implemented integrally with the vehicle, may be implemented in a form that is installed or attached to the vehicle as a configuration separate from the vehicle, or a part thereof may be implemented integrally with the vehicle, and another part may be implemented in a form that is installed or attached to the vehicle as a configuration separate from the vehicle.

In the dual power supply apparatus 100, output lines outputting a voltage of 24 V and a voltage of 12 V are respectively connected to the autonomous driving loads 111 and 114, a line connected to the autonomous driving load 111 and outputting the 24 V voltage is configured by connecting a general power line 201 and a redundancy power line 202 in parallel, and a line connected to the autonomous driving load 114 and outputting the 12 V voltage is configured by connecting a normal power line 203 and a redundancy power line 204 in parallel.

Accordingly, power may be continuously supplied to each load through redundant power lines paralleled with a failed line in response to a case where one of the general power lines 201, 203, 205, and 207 fails. Conversely, power may be continuously supplied to each load through general power lines paralleled with a failed line in response to a case where one of the redundant power lines 202, 204, 206, and 208 fails.

As illustrated in FIG. 1, in the present disclosure, the dual power supply apparatus of 12 V and 24 V may be installed at a chassis portion to perform normal power supply and emergency power supply for general loads and autonomous driving loads, and a load inside a cap area may be configured with dual power supply lines by modifying the existing power controller 200.

Referring to FIG. 2, the dual power supply apparatus 100 may include a communication device 110, a storage 120, a power device portion 130, a driver device 140, and a processor 150.

The communication device 110 is a hardware device implemented with various electronic circuits to transmit and receive signals through a wired connection, and may transmit and receive information based on in-vehicle devices and in-vehicle network communication techniques. As an example, the in-vehicle network communication techniques may include controller area network (CAN) communication, local interconnect network (LIN) communication, flex-ray communication, and the like.

As an example, the communication device 110 may transmit failure diagnosis information of an output line of the dual power supply apparatus 100 and failure information of the LDCs 102 and 103 to an autonomous driving control apparatus 300 (in FIG. 3) through a communication bus.

The storage 120 may store data and/or algorithms required for the processor 150 to operate, and the like. As an example, the storage 120 may store an algorithm for monitoring a state of power lines connected between the power device 130 and autonomous driving loads.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

Figure 3:
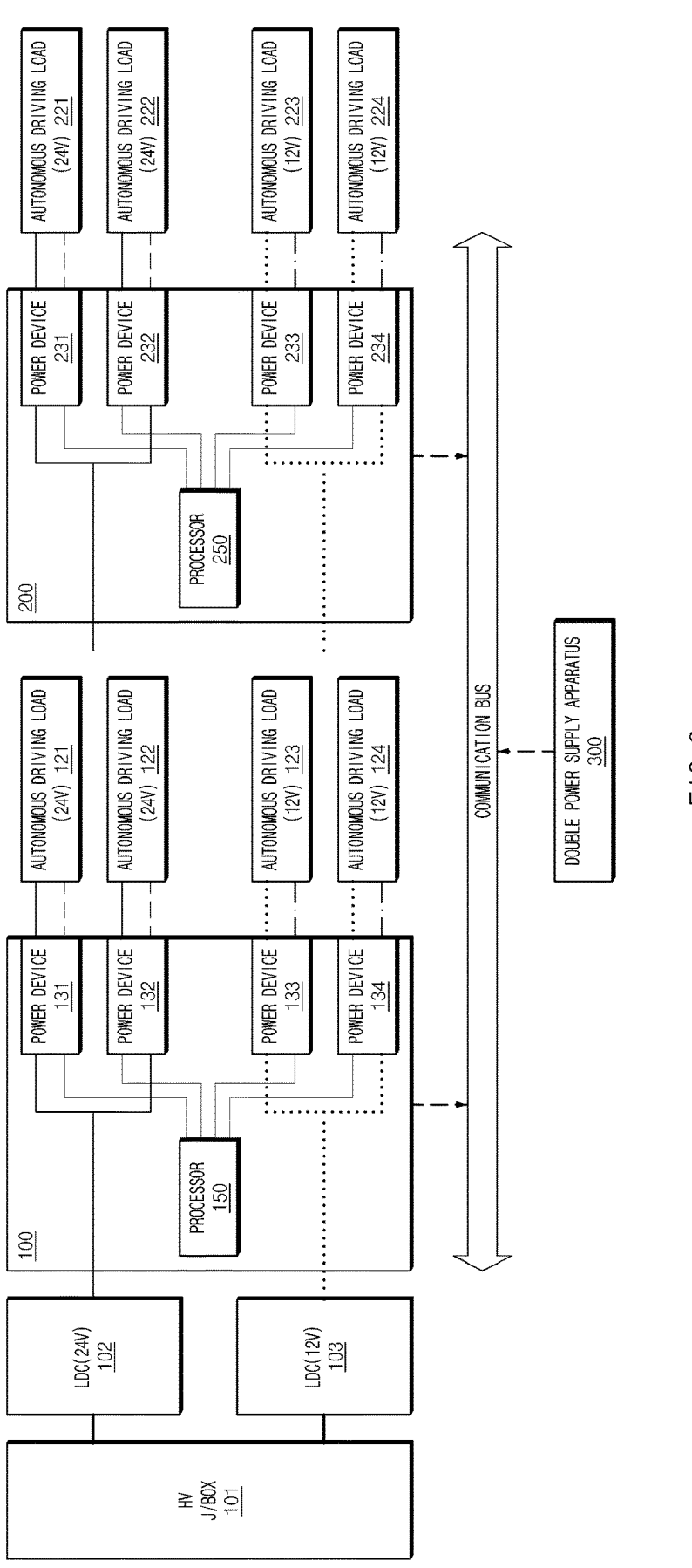
FIG. 3 illustrates a configuration of a vehicle system for power redundancy according to a first exemplary embodiment of the present disclosure.

The power device portion 130, which is a semiconductor device for a small load, may be an intelligent power switch (IPS) and may be formed to include a plurality of power devices 131, 132, 133, and 134 as illustrated in FIG. 3, and the power devices 131, 132, 133, and 134 may be respectively connected to autonomous driving loads 121, 122, 123, and 124 in a one-to-one correspondence.

The power device portion 130 may take a shorter power recovery time than a switching device such as a conventional relay by using a semiconductor device, and may also be advantageous in terms of instantaneous power supply fluctuations. The driver device 140 is a large capacity power driver device for a large capacity load.

The processor 150 may be electrically connected to the communication device 110, the storage 120, the power device portion 130, the driver device 140, and the like, may electrically control each component, and may be an electrical circuit that executes software commands, thereby performing various data processing and calculations described below.

The processor 150 may perform overall control such that each component can normally perform their functions by processing a signal transferred between each component of the dual power supply apparatus 100. The processor 150 may be implemented in the form of hardware, software, or a combination of hardware and software. For example, the processor 150 may be implemented as a microprocessor, but the present disclosure is not limited thereto.

The processor 150 may determine a failure type of the power line and control power to be applied through the redundant power line in response to occurrence of a failure by monitoring an output current outputted from the power devices 131, 132, 133, and 134 and applied to the power line. In this case, the failure type may include overcurrent, open, intermittent inrush, short to ground, short to power, and the like.

The processor 150 may determine whether a pair of power lines (general power line and redundancy power line) between one or more power devices 131, 132, 133, and 134 and the autonomous driving loads 111 and 114 fail, and in response to occurrence of a failure of at least one power line of a pair of power lines, may supply power to the autonomous driving loads 111 and 114 through the other power line in which a failure has not occurred among the pair of power lines.

The processor 150 may cut off power supply to the general loads 106 and 107 by blocking the general power lines connected to the general loads 106 and 107 in response to a failure of the general power lines connected to the general loads 106 and 107.

The processor 150 cuts off the general power lines 201 and 203 in response to a failure of the general power lines 201 and 203 of the autonomous driving loads 111 and 114, and supplies power to the autonomous driving loads 111 and 114 through the redundant power lines 202 and 204.

The processor 150 may monitor output currents of one or more power devices to determine whether a pair of power lines have failed. In this case, the processor 150 may determine whether both the general power line and the redundancy power line fail.

The processor 150 may determine a failure type in response to a failure of at least one power line, and may transmit the failure type to the autonomous driving control apparatus 300 through the communication device 110.

FIG. 3 illustrates a configuration of a vehicle system for power redundancy according to a first exemplary embodiment of the present disclosure.

In FIG. 3, as a detailed configuration of the dual power supply apparatus 100, the communication device 110, the storage 120, and the driver device 140 are omitted for convenience, and the power devices 131, 132, 133, and 134 and the processor 150 are illustrated.

The power devices 131, 132, 133, and 134 are connected to the autonomous driving loads 121, 122, 123, and 134, respectively, and one power device and one autonomous driving load in one-to-one correspondence are connected through a pair of lines having a structure in which a general power line and a redundancy power line are connected in parallel. Accordingly, the dual power supply apparatus 100 may determine a failure state such as open, short-to-ground, short-to-power, intermittent inrush, etc. of a power line (general line or redundancy power line) connected between the power devices 131, 132, 133, and 134 and the autonomous driving load 121, 122, 123, and 134 by individually monitoring an output current of each of the power elements 131, 132, 133, and 134, and in response to occurrence of a failure, may immediately cut off an output of the corresponding power device and supply power through the redundant power line.

The power devices 131, 132, 133, and 134 may supply power through the redundant power line in response to a failure of the general power line.

In this case, the autonomous driving loads 121 and 122 are loads using the 24 V voltage, and the autonomous driving loads 123 and 124 are loads using the 12 V voltage.

The power devices 131 and 132 receive the 24 V voltage from the LDC 102 to apply it to the autonomous driving loads 121 and 122, respectively. The power devices 133 and 134 receive the 12V voltage from the LDC 102 to apply it to the autonomous driving loads 123 and 124, respectively.

FIG. 3 discloses an example in which a dual power line is configured not only in the dual power supply apparatus 100 but also in the power controller 200. That is, for a commercial vehicle with a long vehicle length, two dual power supply apparatuses 100 may be provided for a dual power line configuration, or a dual power line may be configured using one dual power supply apparatus 100 and one power controller 200. In this case, the power controller 200 may perform a same role as that of the dual power supply apparatus 300.

In addition, the dual power supply apparatus 100 may diagnose the failure type, and may transmit the failure type to the autonomous driving control apparatus 300 through a communication bus. Accordingly, the autonomous driving control apparatus 300 may perform autonomous driving control according to the failure type. For example, the failure type may include open, short to ground, short to power, intermittent inrush, overload, and the like, and control such as lowering an autonomous driving level may be performed according to the failure type. In addition, in response to a case where the failure type is overload, the dual power supply apparatus 100 may determine it as a temporary overload, and may diagnose the failure type again after a predetermined time has elapsed. In addition, the dual power supply apparatus 100 completely cuts off the general power line where a failure occurs in response to a case where the failure type is an open state. In addition, the processor 150 may completely cut off power applied to a corresponding load, and may change the autonomous driving level to level 1 for safety, in response to failures of not only the general power line but also the redundancy power line.

In addition, the dual power supply apparatus 100 may be typically installed in two locations, a chassis and an interior, in order to secure ease of vehicle development and to reduce an amount of wires used.

The power controller 200 may also include a plurality of power devices 231, 232, 233, and 234 and a processor 250 for dual power supply, and may further include a communication device, a storage, a driver device, and the like, as in the dual power supply apparatus 100 of FIG. 2.

The power devices 231, 232, 233, and 234 are connected to the autonomous driving loads 221, 222, 223, and 234, respectively, and in one power device and one autonomous driving load in one-to-one correspondence.

Each of power devices 231, 232, 233, and 234 and autonomous driving loads 221, 222, 223, and 234 are connected using a parallel pair of lines having a general power line and a redundancy power line. Accordingly, the power devices 231, 232, 233, and 234 may supply power through the redundant power line in response to a failure of the general power line.

In addition, the processor 250 may diagnose a failure occurrence type, and may transmit the failure occurrence type to the autonomous driving control apparatus 300 through a communication bus.

Figure 4:
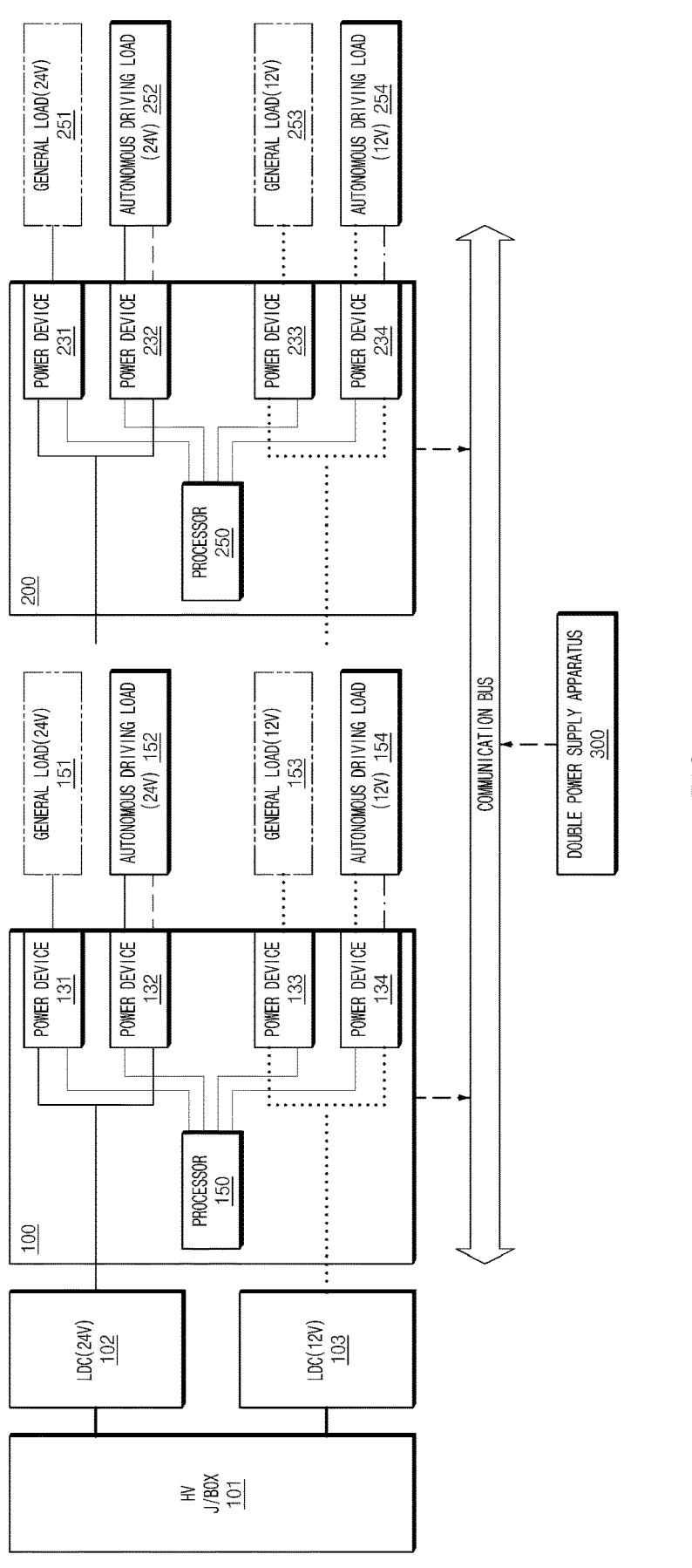
FIG. 4 illustrates a configuration of a vehicle system for power redundancy according to a second exemplary embodiment of the present disclosure.

FIG. 4 illustrates a configuration of a vehicle system for power redundancy according to a second exemplary embodiment of the present disclosure.

Referring to FIG. 4, the power devices 131 and 133 of the dual power supply apparatus 100 supply power to general loads 151 and 153, and the power device 132 supplies power to autonomous driving loads 152 and 154.

In this case, it is connected only to the general power line to supply power to the general loads 151 and 153, and in order to supply power to the autonomous driving loads 152 and 154, it is connected to the normal power line and the redundancy power line.

Power devices 231 and 233 of the power controller 200 supply power to general loads 251 and 253, and a power device 232 supplies power to autonomous driving loads 252 and 254.

In this case, it is connected only to the general power line to supply power to the general loads 251 and 253, and in order to supply power to the autonomous driving loads 252 and 254, it is connected to the normal power line and the redundancy power line.

As such, the dual power supply apparatus 100 according to the present disclosure may supply power to a general load as well as an autonomous driving load together, and may connect a normal power line and a redundancy power line in parallel for redundancy in response to a failure of the power line of the autonomous driving load.

Figure 5:
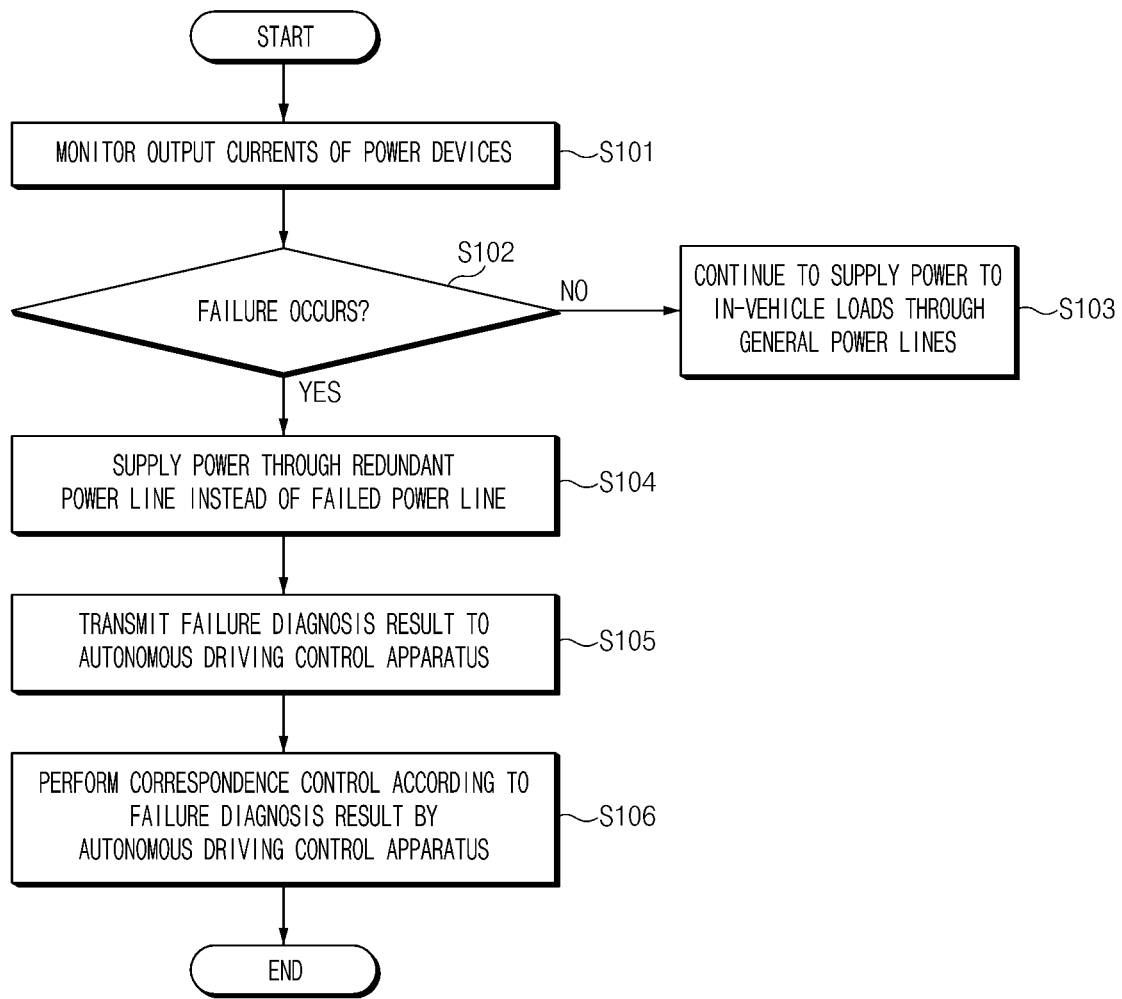
FIG. 5 illustrates a flowchart showing a power redundancy method according to the first embodiment of the present disclosure.

Hereinafter, a dual power supply method according to an exemplary embodiment of the present disclosure will be described with reference to FIG. 5. FIG. 5 illustrates a flowchart showing an example dual power supply method.

Hereinafter, it is assumed that the dual power supply apparatus 100 of the of FIG. 1 and FIG. 3 performs processes of FIG. 5. In addition, in the description of FIG. 5, operations described as being performed by a device may be understood to be controlled by the processor 150 of the dual power supply apparatus 100 and the processor 250 of the power controller 200.

Referring to FIG. 5, the dual power supply apparatus 100 monitors output currents of the power devices 131, 132, 133, and 134 (S101). The dual power supply apparatus 100 may determine whether the output currents applied from the power devices 131, 132, 133, and 134 to the autonomous driving loads 121, 122, 123, and 124 through the general power lines (24 V and 12 V) are smaller than a predetermined reference value, may determine that a failure has occurred in the corresponding general power line in response to a case where the output currents applied from the power devices 131, 132, 133, and 134 to the autonomous driving loads 121, 122, 123, and 124 are smaller than the predetermined reference value.

In response to a case where all general power lines do not fail, the dual power supply apparatus continues to supply power to loads in the vehicle through the general power lines (S103).

In response to a case where a failure occurs in one of the general power lines, the dual power supply apparatus 100 supplies power through the redundant power line instead of the failed power line (S104).

Subsequently, the dual power supply apparatus 100 transmits a failure diagnosis result to the autonomous driving control apparatus 300 (S105), and the autonomous driving control apparatus 300 performs autonomous driving correspondence control according to the failure diagnosis result received from the dual power supply apparatus 100 (S106).

Figure 6:
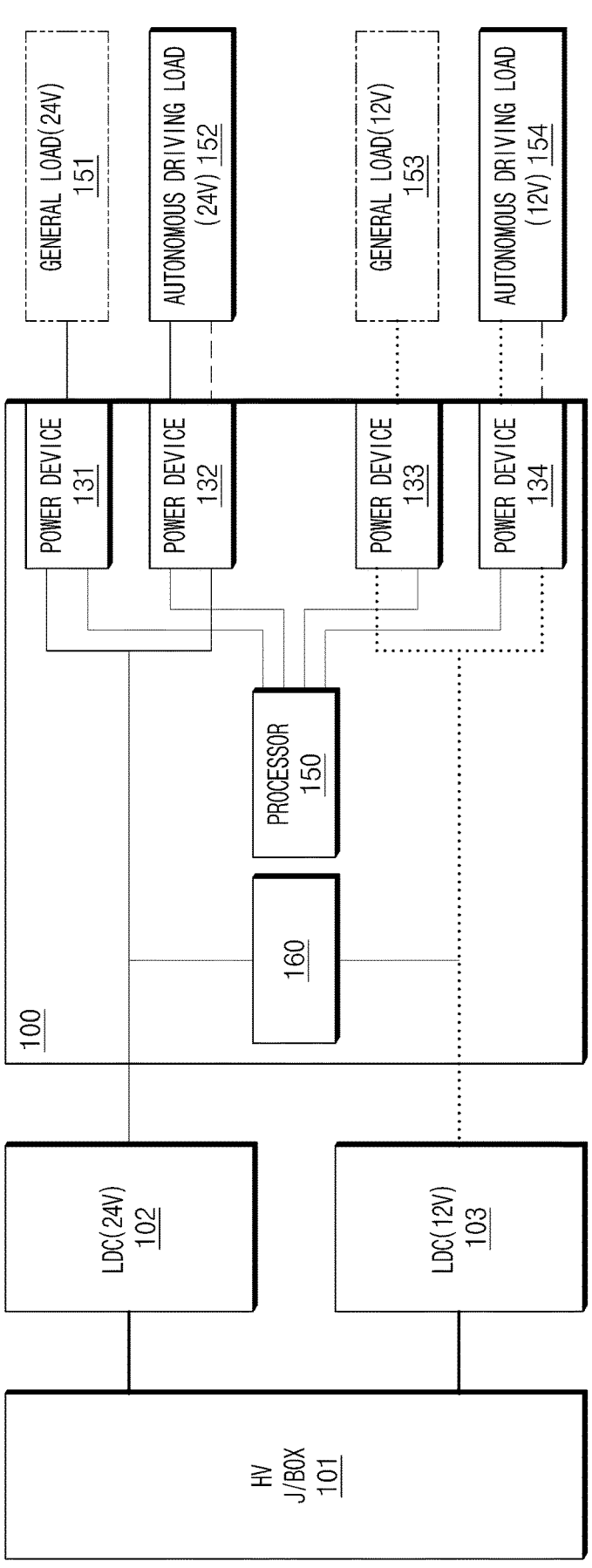
FIG. 6 illustrates a configuration of a vehicle system for power redundancy according to a third exemplary embodiment of the present disclosure.

FIG. 6 illustrates a configuration of a vehicle system for power redundancy according to a third exemplary embodiment of the present disclosure. In FIG. 6, as in FIG. 6, a process of cutting off the general power line where a failure occurred and supplying power to the autonomous driving loads 152 and 154 through the redundancy power line in response to a failure of the general power line between the power devices 131 and 133 and the autonomous driving loads 152 and 154 and between the power devices 132 and 134 and the general loads 151 and 153 is the same. However, FIG. 6 illustrates an example for supplying power to a general load or an autonomous driving load in consideration of a failure occurrence situation of the LDCs 102 and 103.

To this end, the dual power supply apparatus 100 may be configured by adding a bidirectional converter 160 to the detailed configuration of FIG. 2.

The dual power supply apparatus 100 may receive LDC failure information from the LDCs 102 and 103 or from another control device (e.g., a battery management device) to determine whether the LDC fails. In this case, the dual power supply apparatus 100 may receive no power from the LDC 102 and 103, or may receive LDC failure information from a separate control device (e.g., a battery management device, etc.) to determine whether the LDC has failed.

In response to a failure of at least one of the LDCs 102 and 103 fails, the bidirectional converter 160 converts a voltage of an non-failed LDC to allow the output voltage of the failed LDC to be supplied to the power device. For example, in response to a failure of the LDC 102 providing a 24 V voltage, the bidirectional converter 160 may convert a 12 V voltage applied from the non-failed LDC 103 into the 24 V voltage to apply it to the power devices 131 and 132 that require it.

Conversely, in response to a failure of the LDC 103 providing a 12 V voltage, the bidirectional converter 160 may convert a 24 V voltage applied from the non-failed LDC 102 into the 12 V voltage to apply it to the power devices 133 and 134 that require it.

As such, in the third exemplary embodiment of the present disclosure, safety of vehicle driving may be increased by supplying power to a load in consideration of not only the failure of the power line for supplying power from the power device to the load, but also the failure of the LDC.

As illustrated in FIG. 6, in response to the failure of the LDC, the bidirectional converter 160 enables a voltage to be supplied through an LDC in which a failure does not occur.

Figure 7:
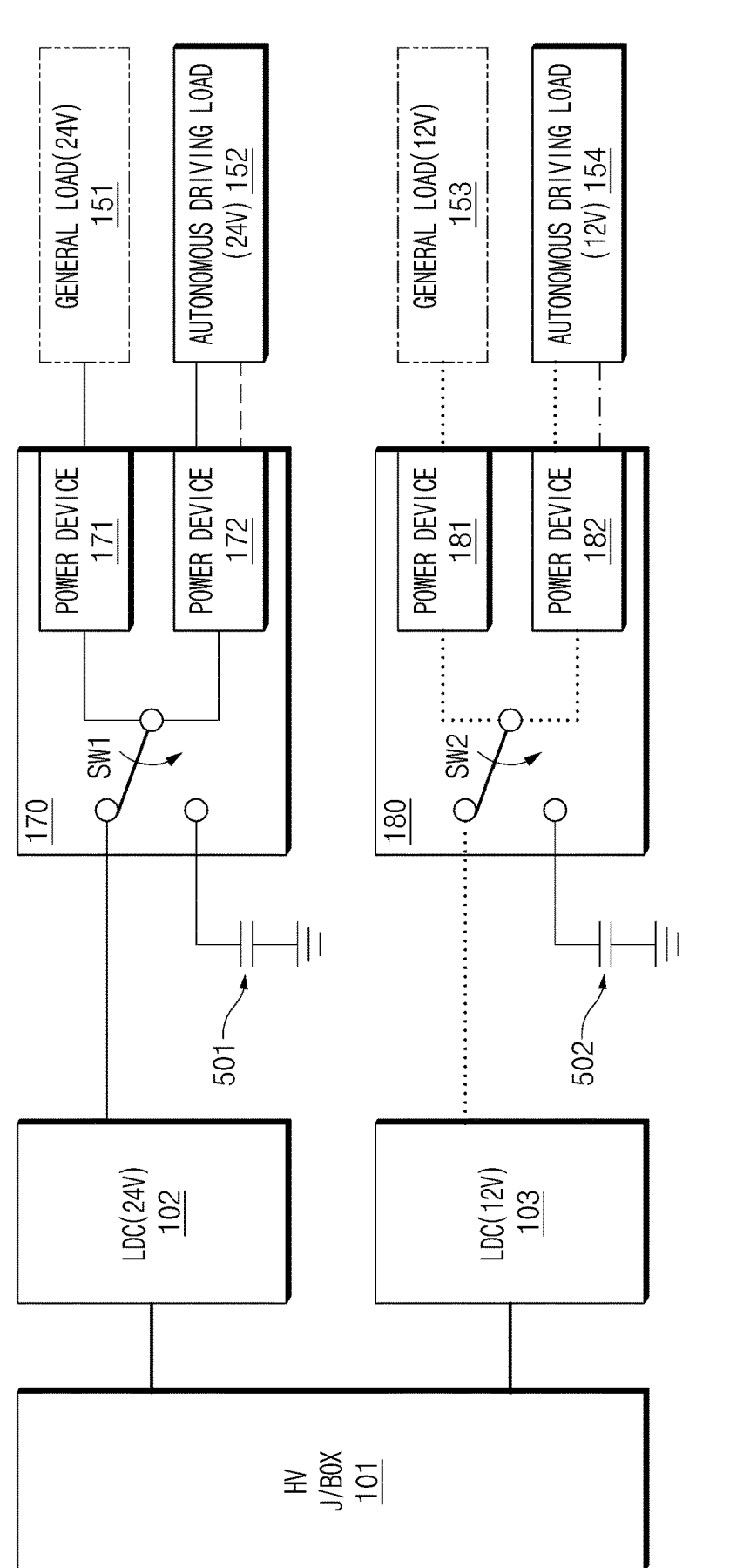
FIG. 7 illustrates a configuration of a vehicle system for power redundancy according to a fourth exemplary embodiment of the present disclosure.

FIG. 7 illustrates a configuration of a vehicle system for power redundancy according to a fourth exemplary embodiment of the present disclosure. In FIG. 7, as in FIG. 6, a process of cutting off the general power line where a failure occurred and supplying power to the autonomous driving loads 152 and 154 through the redundancy power line in response to a failure of the general power line between the power devices 131 and 133 and the autonomous driving loads 152 and 154 and between the power devices 132 and 134 and the general loads 151 and 153 is the same. However, FIG. 7 illustrates an example for supplying power to a general load or an autonomous driving load in consideration of a failure occurrence situation of the LDCs 102 and 103.

To this end, the dual power supply apparatus 100 may be configured separately for 24 V and 12 V. That is, the dual power supply apparatus 100 includes a 24 V dual power supply apparatus 170 and a 12 V dual power supply apparatus 180.

The dual power supply apparatuses 170 and 180 may further include power storage nodes 501 and 502 in the configuration of FIG. 2, respectively. However, for convenience of description, in FIG. 7, a configuration of the communication device 110, the storage 120, the driver device 140, and the processor 150 of FIG. 2 are omitted, but power devices 171, 172, 181, and 182, switching devices SW1 and SW2, and power storage nodes 501 and 502 are illustrated.

The 24 V dual power supply apparatus 170 includes power devices 171 and 172, a switching device SW1, and a power storage node 501.

The processor 150 (illustrated in FIG. 2) may control the switching device SW1 in response to the failure of the LDC 102 to switch a first side of the switching element SW1 connected to an output terminal of the LDC 10 to be connected to an terminal of the power storage node 501. In this case, a second side of the switching element SW1 is connected to the power devices 171 and 172. Accordingly, in response to a failure of the LDC 102, a 24 V voltage of the power storage node 501 may be applied to the power devices 171 and 172, and thus the power devices 171 and 172 may normally supply power to the general load 151 and the autonomous driving load 152.

In addition, the 12 V dual power supply apparatus 180 includes power devices 181 and 182, a switching device SW2, and a power storage node 502.

The processor 150 (illustrated in FIG. 2) may control the switching device SW2 in response to the failure of the LDC 103 to switch a first side of the switching element SW2 connected to an output terminal of the LDC 10 to be connected to an terminal of the power storage node 502. In this case, a second side of the switching element SW12 is connected to the power devices 181 and 182. Accordingly, in response to a failure of the LDC 103, a 12V voltage of the power storage node 502 may be applied to the power devices 181 and 182, and thus the power devices 181 and 182 may normally supply power to the general load 151 and the autonomous driving load 152.

FIG. 7 discloses an example in which voltages of the power storage nodes 501 and 502 are balanced by applying voltages of the power storage nodes 501 and 502 to the output voltage lines of the LDCs 102 and 103 by including switching elements SW1 and SW2 as balancing elements, but various elements may be used as the balancing elements.

Figure 8:
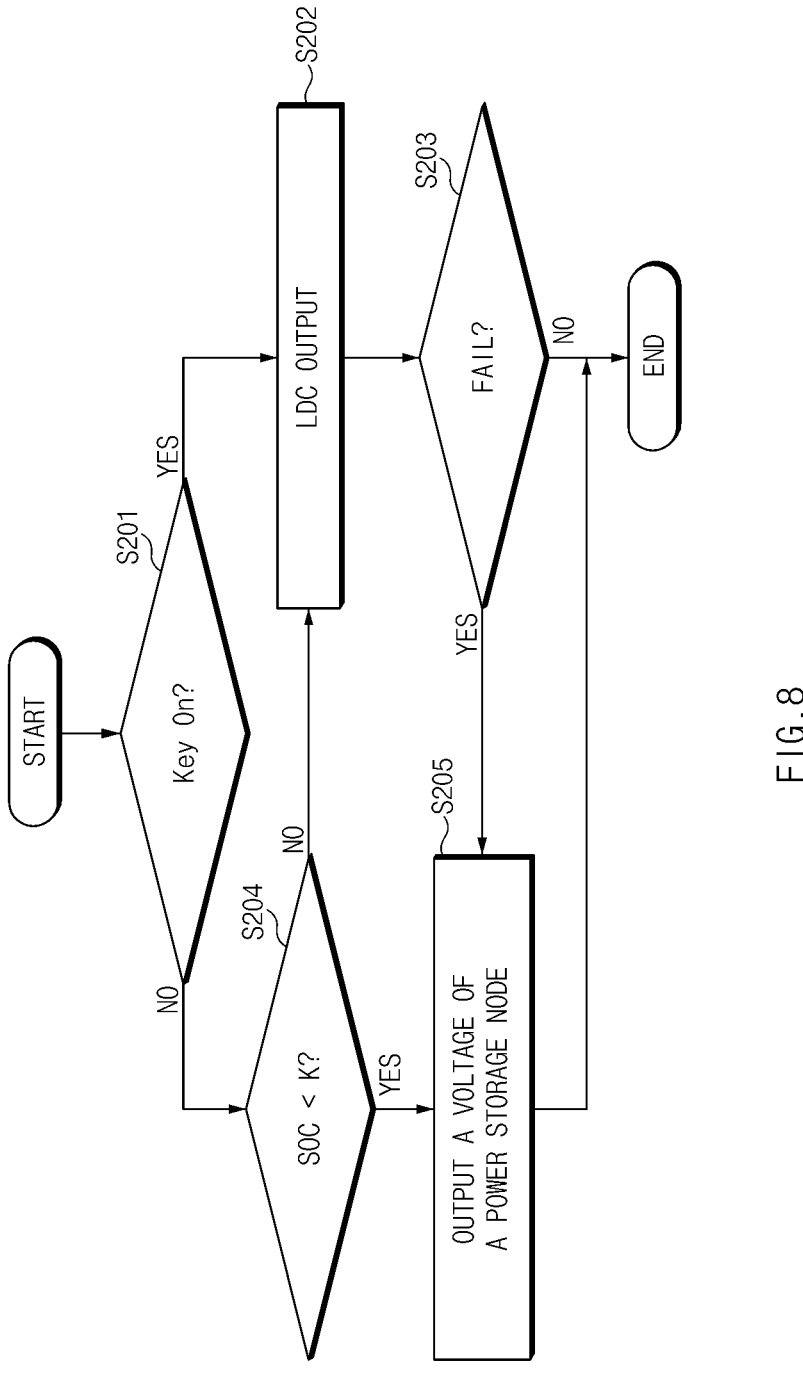
FIG. 8 illustrates a flowchart for describing a dual power supply method according to the fourth exemplary embodiment of the present disclosure.

Hereinafter, a dual power supply method according to a fourth exemplary embodiment of the present disclosure will be described with reference to FIG. 8. FIG. 8 illustrates a flowchart for describing a dual power supply method according to the fourth exemplary embodiment of the present disclosure.

Hereinafter, it is assumed that the dual power supply apparatus 100 of the of FIG. 1 and FIG. 7 performs processes of FIG. 8. In addition, in the description of FIG. 8, operations described as being performed by a device may be understood to be controlled by the processor 150 of the dual power supply apparatus 100 and the processor 250 of the power controller 200.

Referring to FIG. 8, the dual power supply apparatus 100 determines whether a vehicle is in a key-on state (S201). That is, the dual power supply apparatus 100 determines whether a starting state of the vehicle is on.

In a case of the key-on state, a vehicle system outputs a voltage through an LDC (S202).

Subsequently, the dual power supply apparatus 100 determines whether the LDCs 102 and 103 fail or a general power line fails (S203).

Power supply continues in a normal state in response to a case where a failure of the LDCs 102 and 103 or a failure of the general power line does not occur.

In response to a case where a general power line fails, the dual power supply apparatus 100 supplies power to an autonomous driving load through a redundant power line.

On the other hand, in response to a case where a failure of the LDCs 102 and 103 occurs, the dual power supply apparatus 100 outputs a voltage of the power storage nodes 501 and 502 to supply the voltage to a normal load or an autonomous driving load instead of the failed LDC (S205).

In response to a case where the vehicle is not in the key-on state in step S201, the dual power supply apparatus 100 determines whether a stage of charge (SOC) of the high voltage battery 101 is smaller than a predetermined reference value K (S204). In this case, battery sensors 115 and 116 may measure the SOC of the high voltage battery 101 converted from the LDCs 102 and 103, the dual power supply apparatus 100 may receive SOC measurement results from the battery sensors 115 and 116 to determine a level of voltages outputted from the LDCs 102 and 103, respectively.

The dual power supply apparatus 100 outputs voltage through the LDCs 102 and 103 when the SOC (stage of charge) of the high voltage battery 101 of the vehicle is greater than the predetermined reference value K (S202).

Meanwhile, in response to a case where the SOC (stage of charge) of the high voltage battery 101 is smaller than the predetermined reference value K, a voltage may be outputted through the power storage nodes 501 and 502 (S205).

For example, in response to a case where the SOC of the voltage outputted from the LDC 102 is smaller than the predetermined reference value, a output voltage level of the LDC 102 is increased through the power storage node 501.

As in FIG. 7 and FIG. 8, according to the present disclosure, in response to occurrence of a failure of the LDC, power may be supplied through the separate power storage nodes 501 and 502 instead of the LDC in which the failure occurs through a switching device.

According to the present technique, it is possible to ensure that autonomous vehicles are not disrupted in receiving power by configuring individual power supply lines between a power device and an autonomous driving load in parallel, and in response to a failure diagnosis of one power line, supplying redundant power through another power line, thereby increasing reliability of the autonomous vehicles.

In addition, according to the present disclosure, it is advantageous to shorten a time for power recovery and in case of instantaneous power change by configuring to select a power line using a power device that is a semiconductor device.

Furthermore, according to the present disclosure, it is possible to increase the reliability of the autonomous vehicles by considering and responding to the failure of the LDC as well as the failure of the individual power supply line between the power device and the autonomous driving load.

Figure 9:
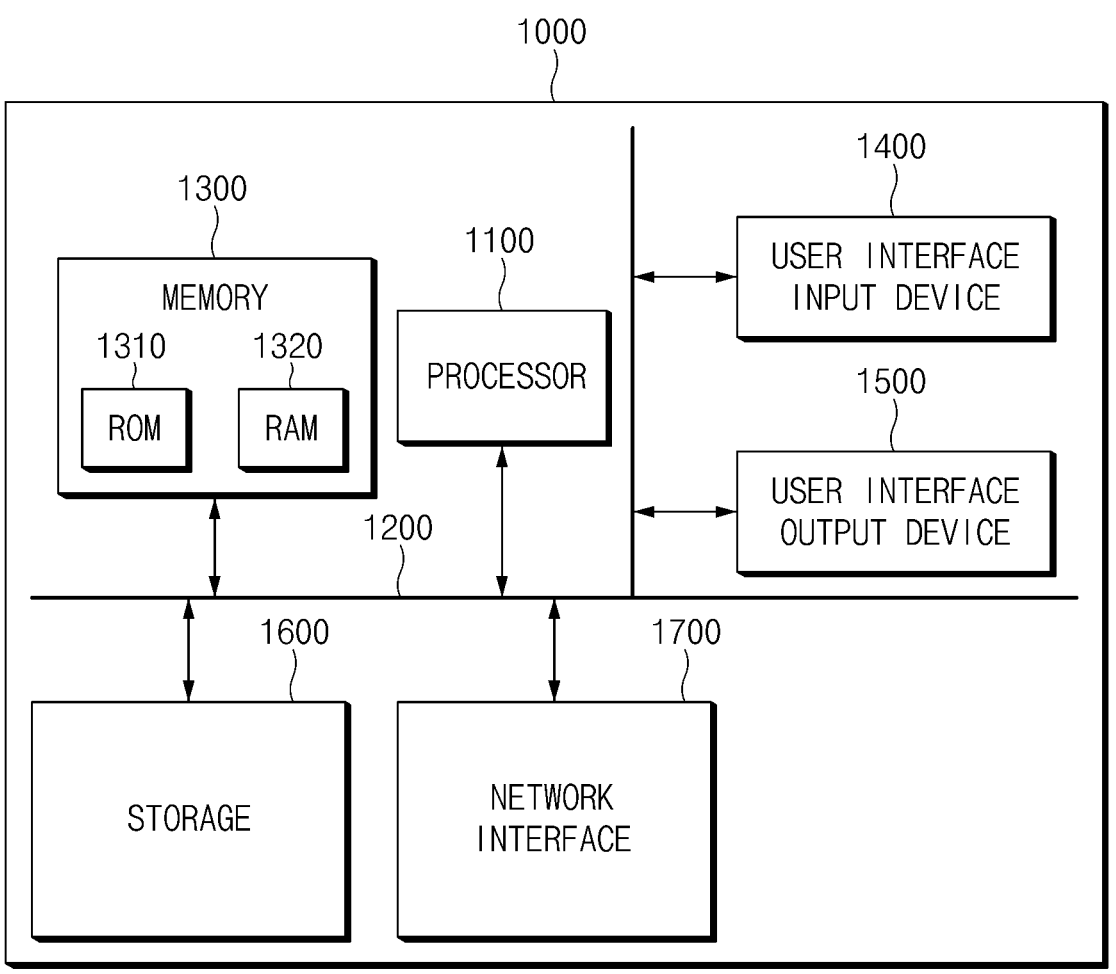
FIG. 9 illustrates an exemplary computing system.

FIG. 9 illustrates an example computing system.

Referring to FIG. 9, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC).

The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

What is claimed is:

1. A dual power supply apparatus for a vehicle, the dual power supply apparatus comprising:

at least one power device configured to supply power to an autonomous driving load or a general load in the vehicle; and a pair of power lines provided between the at least one power device and the autonomous driving load, and a processor configured to determine whether a first power line of the pair of power lines has failed and to supply power to the autonomous driving load through a second power line of the pair of power lines in response to failure of the first power line, wherein the at least one power device includes a first power device and a second power device, and wherein the first power device is connected to a first general load through a first general power line, and the second power device is connected to a first autonomous driving load through the pair of power lines including the first general power line and a first redundancy power line.

2. The dual power supply apparatus of claim 1, wherein the processor is configured to determine a failure type of the first power line, and further comprising a communication device configured to transmit the failure type to an autonomous driving control apparatus.

3. The dual power supply apparatus of claim 1, wherein the at least one power device includes the first power device configured to supply power to the first general load through the first general power line and to cut off the first general power line in response to failure of the first general power line.

4. The dual power supply apparatus of claim 3, further comprising:

the second power device configured to supply power to the first autonomous driving load through a second general power line and to supply power through a redundancy power line in response to failure of the second general power line.

5. The dual power supply apparatus of claim 1, wherein the processor is configured to monitor an output current of the at least one power device to determine whether there is failure of at least one of the pair of power lines.

6. The dual power supply apparatus of claim 1, wherein in response to failure of a first power conversion module that converts a high voltage of a high voltage battery to a first voltage level, a bidirectional converter is configured to convert a voltage of a second power conversion module that converts the high voltage of the high voltage battery into a second low voltage level to the first voltage level to supply the converted voltage to the at least one power device.

7. The dual power supply apparatus of claim 1, further comprising:

a first power storage node configured to store a voltage of a first voltage level;

a second power storage node configured to store a voltage of a second voltage level that is lower than the first voltage level;

a first balancing device configured to control connection with the first power storage node and the at least one power device; and a second balancing device configured to control connection with the second power storage node and the at least one power device.

8. The dual power supply apparatus of claim 7, wherein the processor is configured, in response to failure of a first power conversion module that converts a high voltage of a high voltage battery to the first voltage level, to control the first balancing device to apply the voltage of the first power storage node to the first power device and the second power device outputting the first voltage level among the at least one power device.

9. The dual power supply apparatus of claim 8, wherein the processor is configured, in response to failure of a second power conversion module that converts a high voltage of a high voltage battery to the second voltage level, to control the second balancing device to apply the voltage of the second power storage node to a third power device and a fourth power device outputting the second voltage level among the at least one power device.

10. The dual power supply apparatus of claim 9, wherein the processor is configured to drive the first power conversion module and the second power conversion module in response to a case where a state of charge (SOC) of the high voltage battery is equal to or greater than a predetermined reference value, and to supply a voltage to the at least one power devices using the first power storage node and the second power storage node in response to a case where the SOC of the high voltage battery is smaller than the predetermined reference value.

11. The dual power supply apparatus of claim 9, wherein the processor is configured to drive the first power conversion module in response to the SOC of the voltage outputted from the first power conversion module is equal to or greater than the predetermined reference value, and to supply a voltage to the at least one power device using the first power storage node in response to a case where the SOC of the voltage outputted from the first power conversion module is smaller than the predetermined reference value.

12. A vehicle comprising the dual power supply apparatus of claim 1.

13. A system comprising:

a high voltage battery;

a first power conversion module configured to convert a high voltage of the high voltage battery to a first voltage level;

a second power conversion module configured to convert the high voltage of the high voltage battery to a second voltage level that is lower than the first voltage level; and a dual power supply apparatus configured to supply power to an autonomous driving load or a general load in a vehicle, wherein the dual power supply apparatus comprises:

at least one power device configured to supply power to an autonomous driving load or a general load in the vehicle; and a pair of power lines provided between the at least one power device and the autonomous driving load, and a processor configured to determine whether a first power line of the pair of power lines has failed and to supply power to the autonomous driving load through a second power line of the pair of power lines in response to failure of the first power line, wherein the at least one power device includes a first power device and a second power device, and wherein the first power device is connected to a first general load through a first general power line, and the second power device is connected to a first autonomous driving load through the pair of power lines including the first general power line and a first redundancy power line.

14. The system of claim 13, wherein the dual power supply apparatus is configured to convert the second voltage level of the second power conversion module into the first voltage level to apply the converted voltage level to the at least one power device in response to failure of the first power conversion module.

15. The system of claim 13, wherein the dual power supply apparatus is configured, in response to failure of the first power conversion module or the second power conversion module, to apply a voltage of the first voltage level or the second voltage level to the at least one power device instead of the first power conversion module or the second power conversion module in which the failure occurs using a power storage node.

16. The system of claim 13, further comprising:

a power controller configured to supply power to the autonomous driving load or the general load.

17. A dual power supply method of a power supply apparatus including a pair of power lines arranged between at least one power device and an autonomous driving load in a vehicle, the method comprising:

determining, by a processor, whether a first power line of the pair of power lines has failed; and supplying, by the processor, power to the autonomous driving load through a second power line of the pair of power lines in response to failure of the first power line, wherein the at least one power device includes a first power device and a second power device, and wherein the first power device is connected to a first general load through a first general power line, and the second power device is connected to a first autonomous driving load through the pair of power lines including the first general power line and a first redundancy power line.

18. The dual power supply method of claim 17, further comprising:

determining, by the processor, a failure type in response to a failure of the first power line; and transmitting the failure type to an autonomous driving control apparatus.

19. The dual power supply method of claim 17, wherein the pair of power lines includes a normal power line and a redundancy power line, and wherein supplying power to the autonomous driving load includes:

supplying, by the processor, power through the redundancy power line in response to failure of the normal power line.

20. The double power supply method of claim 17, further comprising:

monitoring, by the processor, an output current of the at least one power device to determine whether at least one of the pair of power lines has failed.

\* \* \* \* \*